United States Patent [19]
Belokin

[11] 4,195,615
[45] Apr. 1, 1980

[54] RETRIEVABLE PROJECTILE GUN

[76] Inventor: Martin P. Belokin, Rte. 4, Hayward, Wis. 54843

[21] Appl. No.: 854,656

[22] Filed: Nov. 25, 1977

[51] Int. Cl.² ............................................. F41B 7/02
[52] U.S. Cl. ...................................... 124/16; 43/135; 273/419; 273/428
[58] Field of Search ................. 124/16, 27, 25, 41 R, 124/35 R, 26, 31; 43/135; 273/106 R, 106 E, 106 F, 95 A; 46/74 R, 74 A, 74 B, 81, 84

[56] References Cited
U.S. PATENT DOCUMENTS

| | | | |
|---|---|---|---|
| 2,140,875 | 12/1938 | Kahler | 43/135 |
| 2,531,635 | 11/1950 | Maager | 273/106.5 B |
| 2,578,352 | 12/1951 | Grunkemeyer | 43/135 |
| 3,148,428 | 9/1964 | Miller | 124/26 X |
| 3,465,744 | 9/1969 | Nielsen | 124/31 X |

FOREIGN PATENT DOCUMENTS 552598 12/1956 Italy .......................................... 46/74 B Primary Examiner—Richard C. Pinkham
Assistant Examiner—William R. Browne
Attorney, Agent, or Firm—James E. Nilles

[57] ABSTRACT

A gun that shoots a projectile including a flexible screen-like disc to kill flies, insects or the like, the projectile carrying its own spring which powers the projectile. The gun is formed of plastic and has an integral trigger including a catch that holds the projectile in cocked position.

8 Claims, 7 Drawing Figures

RETRIEVABLE PROJECTILE GUN

BACKGROUND OF THE INVENTION

Retrievable projectiles have heretofore been proposed for small toy guns for shooting various types of projectiles. Many of these guns are potentially dangerous because they have a power source in the gun itself and consequently can shoot a variety of dangerous projectiles. Other prior art devices of this character have been proposed to kill flies or insects, but have had certain shortcomings.

One example of the prior art is shown in U.S. Pat. No. 1,291,113 which issued Jan. 14, 1919 and entitled "Toy Pistol" and which has the power mechanism such as a spring located in the gun itself. Consequently, any projectile can be inserted in the gun and fired therefrom, including the intended hollow bulbous head 22 formed of wired gauze. Another example of prior art is shown in the U.S. Pat. No. 1,310,124 which issued July 15, 1919; while that device was used as a fly swatter, it employed a disc of screening material having a rigid outer edge and a spiral spring was used with the screening material so that the latter could tilt as a whole, even if it were rigid, and thereby set firmly against the surface on which the fly or other insect was located so as to insure killing thereof. That fly swatter was powered by means located in the pistol, such as air and was capable of firing various other types of objects.

Another example of prior art is shown in the U.S. Pat. No. 1,387,922 which issued Aug. 16, 1921 and was also used as a fly swatter and it also utilized a power mechanism, such as a spring located in the gun itself and thus the gun was capable of firing various projectiles, some of which may be of a dangerous nature. That fly swatter also had a solid disc at the forward part of the projectile and as a result that device required extreme accuracy in order to kill a fly.

SUMMARY OF THE INVENTION

The present invention provides a spring powered, retrievable projectile gun assembly which finds considerable utility as a fly swatter. The assembly includes a gun having an elongated barrel, an integral trigger mechanism, and a handle portion, all of which are formed as a single plastic member. The fly swatter also includes a projectile in the form of a tubular member that is telescoped over the barrel of the gun, the rear end of the projectile having means for engagement by the trigger so as to hold the projectile in loaded position and permit its firing when the trigger is released. The projectile at its forward end has a foraminated sheet of plastic screen, that is, a flat, disc-like flexible material which may be formed of plastic and which is sufficiently flexible so as to readily deform against the target surface and thereby completely cover the surface and the insect on it so as to insure killing thereof. The power for operating the gun takes the form of a resilient means, i.e. a spring that is located within the projectile itself and carried with it and this results in a heavier projectile for improved accuracy and also importantly, prevents the use of the pistol for shooting unintended projectiles. In other words, the arrangement is such that the power means is carried by the projectile itself.

Another aspect of the invention relates to a retrievable projectile for a gun, the projectile having an elongated member with a front end to which is attached a flat and flexible, transversely arranged element and which is deformable against a surface so as to provide complete contact therewith and thus to insure killing of the fly or the like. A more limited aspect of the invention relates to a projectile of this type in the form of having an elongated power spring which is located within and carried by the projectile.

The entire gun assembly can be disassembled into a flat package and be readily stored and the assembly can also be readily assembled for use.

These and other objects and advantages of the present invention will appear hereinafter as this disclosure progresses, reference being had to the accompanying drawings.

DESCRIPTION OF A PREFERRED EMBODIMENT

Figure 1:
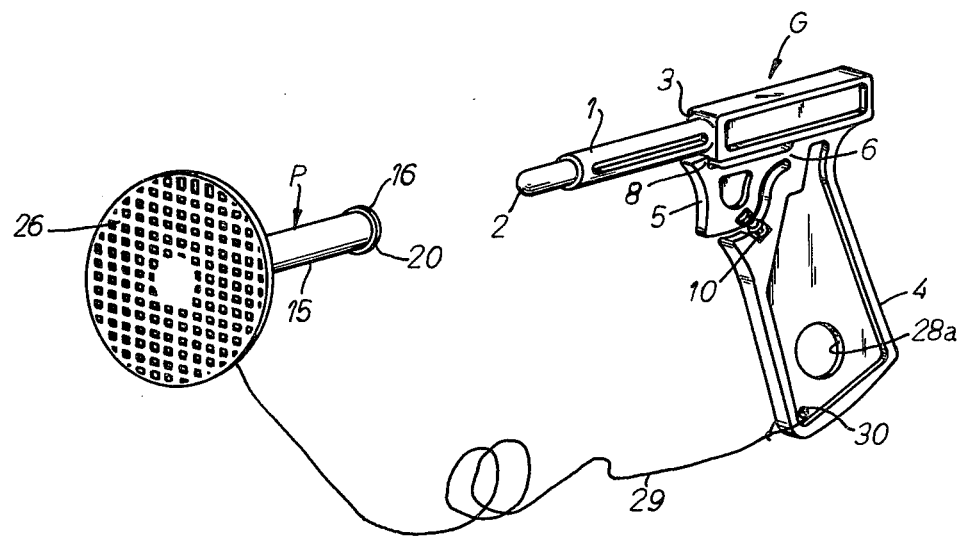
FIG. 1 is a perspective view of the assembly showing the projectile removed therefrom.
Figure 2:
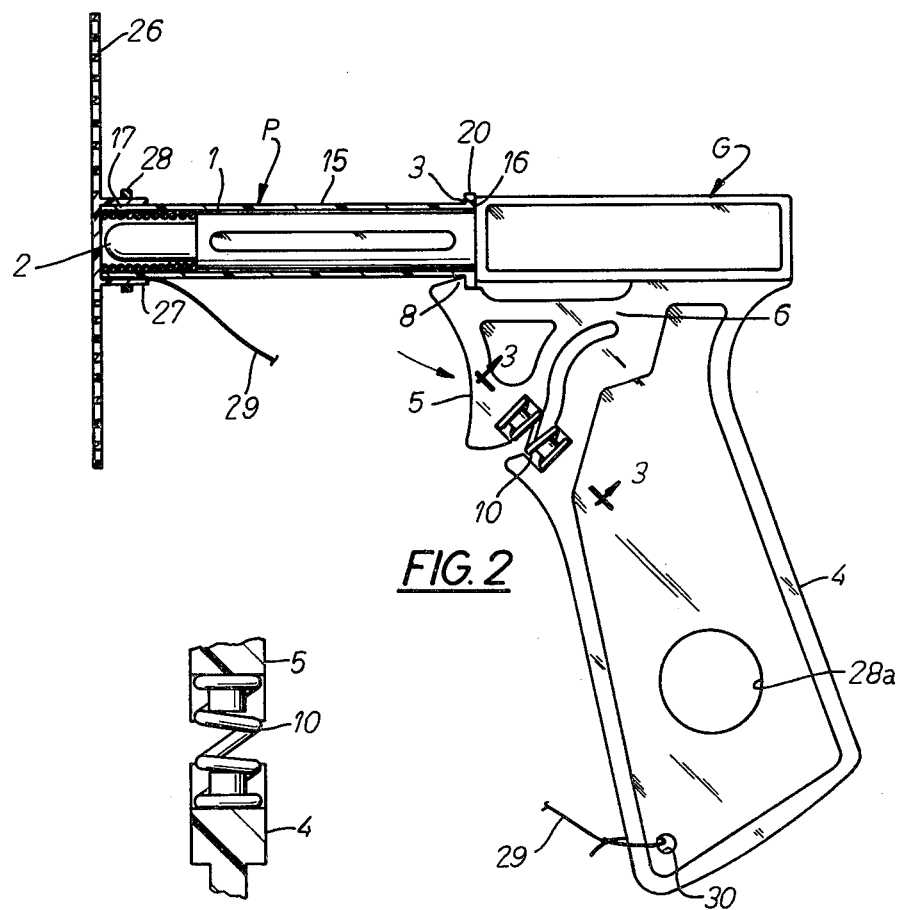
FIG. 2 is a side elevational view of the assembly and showing the projectile in cross-section for the sake of clarity and also showing the trigger spring section.
Figure 3:
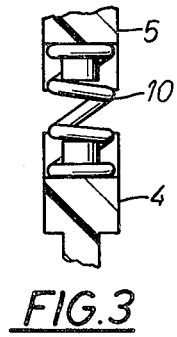
FIG. 3 is an enlarged, cross-sectional view taken generally along the line 3—3 in FIG. 2.
Figure 4:
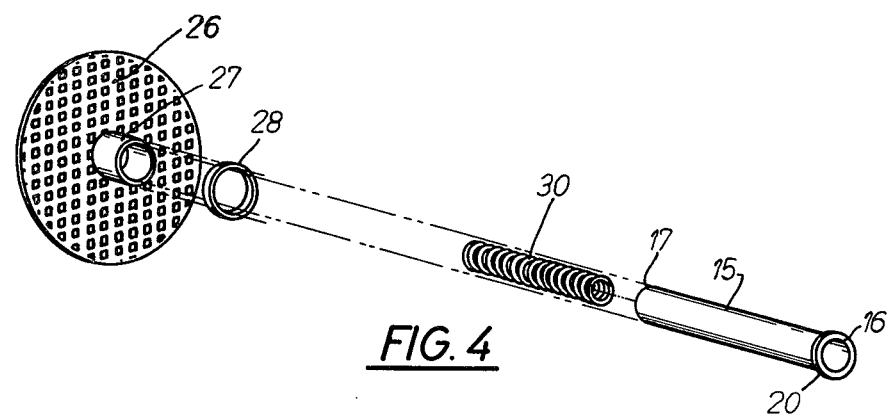
FIG. 4 is a perspective, exploded view of the projectile.
Figure 5:
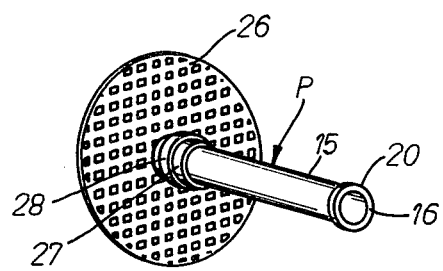
FIG. 5 is a perspective assembled view of the projectile.
Figure 6:
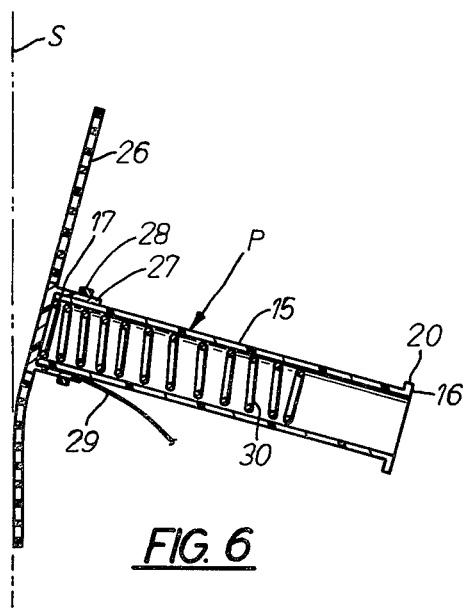
FIG. 6 is a view of the projectile as it initially strikes the target surface and showing the projectile in cross-section.
Figure 7:
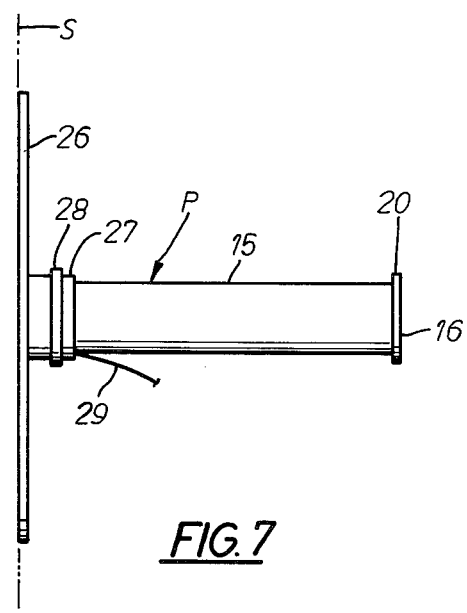
FIG. 7 is an elevational view of the projectile as shown in FIG. 6, but showing the position of the projectile after it has completely engaged the target surface.

The gun type fly swatter assembly provided by the present invention includes a gun G having an elongated barrel 1, the barrel in turn having a front end 2 and a rear end 3. The gun also includes a pistol grip handle 4 having a movable trigger 5 attached integrally therewith by means of the integral hinge 6. The barrel, handle, and trigger are all formed integrally as a single unit from a hard plastic. The trigger has a catch 8 located adjacent the rear end of the barrel and for releasably holding a projectile to be described. Resilient means in the form of a spring 10 is located between the handle and the trigger for urging the latter to a projectile holding position.

The fly swatter assembly also includes a retrievable projectile P having an elongated, tubular member 15 including a rear end 16 and a front end 17. The member has been shown as tubular in form so that it can be telescoped over the barrel of the gun. At the rear end of the projectile elongated member 15 is an annular flange 20 which is releasably engageable by the trigger catch 8 when the projectile P is fully inserted over the barrel 1. Pulling the trigger 5 in the known manner releases the projectile P. The member 15 at its front end 17 has a flat flexible element 26 arranged transversely of and removably connected thereto. The flexible element 26 is formed of soft plastic so as to deform and abut against the target surface S against which it is shot, thereby insuring the killing of the fly or insect thereon. The flexible element may be formed from a foraminated sheet of plastic screen in the shape of a disc.

At the rear side of the flat flexible element is a detachable connection in the form of an integrally formed collar 27 into which the front end 17 of the elongated element 15 is adapted to be firmly inserted. Because the flat flexible element 26 is formed of soft plastic whereas the elongated tubular member 15 is formed of relatively hard plastic, a hard plastic reinforcing ring 28 is slipped over the flexible member collar 27 so as to provide good rigidity thereto and insure that the longated member can be securely fastened to the flat flexible element. Ring 28 can be formed from the material taken out of the handle when hole 28a is originally formed therein.

The projectile also includes a compressible spring 30 located within said elongated member. The front end of the spring is tightly held in the member by the compression fit of end 17, collar 27 and ring 28. This prevents the spring from being separated from the rest of the projectile.

When the projectile is telescoped relative to the barrel of the gun, the spring is compressed so as to form a source of energy or power by means by which the projectile is propelled when the trigger is released. Thus, the spring is carried with the projectile, rather than being left on the gun and consequently, the operator is unable to fire any other objects from the gun. In addition, the spring adds weight to the projectile so as to enhance its killing power.

In order to easily retrieve the projectile, a string 29 is attached to the gun at 30 and also tied to the projectile, as shown.

Resume

The invention provides a compact, economically manufactured and easily assembled and disassembled retrievable projectile gun assembly which finds utility as a fly swatter. The assembly includes a projectile having a flat, flexible, screen-like transverse element across the front end of the projectile and which readily deforms completely against the target surface. The projectile has a self-contained power source and thus prevents the gun from being used for unintended projectiles. The gun of the assembly has a barrel, handle, and movable trigger all formed integrally as a unit of hard plastic. The trigger is connected to the handle by means of an integral, living hinge and the trigger is biased to its projectile holding position by means of a spring located between the trigger and the handle. The entire gun assembly can be completely disassembled for packaging in the flat position or for storage when not in use.

I claim:

1. A gun assembly with a retrievable projectile comprising: a gun including an elongated barrel having a front end and a rear end and also including a handle having a movable trigger, a projectile comprising an elongated member having a forward and rearward end, said member having means at its rearward end for releasable engagement by said trigger and also having a flat flexible element arranged transversely of and connected to said forward end of said member, said flat flexible element being formed as a screen-like material so as to insure flexibility thereof and complete contact of said element against a surface to be hit by said projectile, a compressible spring located within said member and compressible to provide a power source when said member is telescoped relative to said barrel, said spring being carried with said projectile when the latter is fired from said gun.

2. A gun type assembly with a retrievable projectile comprising; a gun including an elongated barrel having a front end and a rear end, a handle having a trigger integrally formed therewith, said trigger being movable relative to said handle about an integral hinge formed between said handle and trigger, said barrel, handle and trigger all formed integrally of plastic, said trigger having engaging means; said assembly also including a projectile comprising an elongated member having a forward and rearward end, said member having means at its rearward end for releasable engagement by said trigger engaging means and also having a flat deformable element that extends a substantial distance transversely of and removably connected to said forward end of said member, a compressible spring located within said member and compressible to provide a power source when said member is telescoped relative to said barrel, said spring being carried by said projectile when the latter is fired from said gun.

3. A gun type fly swatter assembly with a retrievable projectile comprising; a gun including an elongated barrel having a front end and a rear end, a pistol grip handle having a movable trigger integrally formed therewith, said trigger being movable relative to said handle about an integral hinge formed between said handle and trigger, said barrel, handle and trigger all formed integrally of hard plastic, said trigger having engaging means; said assembly also including a projectile comprising an elongated tubular member having a forward and rearward end, said tubular member having a flange at its rearward end for releasable engagement by said trigger engaging means and also having a flat, flexible foraminated sheet of plastic screen arranged transversely of and removably connected to said forward end of said member, a compressible spring fixedly located within said tubular member for being shot therewith, said spring being compressible to provide a power source when said tubular member is telescoped over said barrel.

4. The gun type fly swatter assembly set forth in claim 3 further characterized in that said foraminated sheet of plastic screen is deformable against a surface which it hits so as to provide good contact of said screen against said surface.

5. A gun assembly with a retrievable projectile comprising; a gun including an elongated barrel having a front end and a rear end and also including a handle having a trigger movable with respect to said handle, said barrel secured to and extending from said handle, a projectile comprising an elongated member having a forward and rearward end, said member having means for releasable engagement by said trigger and also having a flat flexible disc-shaped element and extending transversely beyond and connected to said forward end of said member, a compressible spring located within said member and compressible to provide a power source when said member is telescoped relative to said barrel, said spring being carried by said projectile when the latter is fired from said gun.

6. The gun assembly set forth in claim 5 further characterized in that said disc-shaped element is removably secured to said front end of said elongated member.

7. The gun assembly set forth in claim 5 further characterized in that said element is deformable against the surface which it hits so as to provide good contact of said element against said surface.

8. A gun assembly with a retrievable projectile comprising; a gun including an elongated barrel having a front end and a rear end and also including a handle having a movable trigger, a projectile comprising an elongated member having a forward and rearward end, said member having means at its rearward end for releasable engagement by said trigger and also having a flat flexible element arranged transversely of and connected to said forward end of said member, said flat flexible element being of disc-shape and extending transversely beyond the forward end of the member and being readily deformable against the surface which it hits so as to provide good contact therewith, a compressible spring located within said member and compressible to provide a power source when said member is telescoped relative to said barrel, said spring being carried by said projectile when the latter is fired from said gun.

* * * * *